(12) United States Patent
Yamashita et al.

(10) Patent No.: US 6,468,486 B1
(45) Date of Patent: Oct. 22, 2002

(54) PROCESS FOR TREATING EXHAUST GASES CONTAINING NITRIDES

(75) Inventors: Shigeki Yamashita; Masayoshi Kitagawa, both of Kanagawa-ken (JP)

(73) Assignee: Ebara Corporation, Tokyo (JP)

( * ) Notice: Subject to any disclaimer, the term of this patent is extended or adjusted under 35 U.S.C. 154(b) by 21 days.

(21) Appl. No.: 09/655,303

(22) Filed: Sep. 5, 2000

(30) Foreign Application Priority Data

Sep. 6, 1999 (JP) .......................................... 11-252028
Jan. 12, 2000 (JP) ...................................... 2000-003203

(51) Int. Cl.$^7$ ............................................. C01B 21/00
(52) U.S. Cl. ...................... 423/235; 423/353; 423/238
(58) Field of Search ................................ 423/235, 212, 423/213.2, 213.5, 237, 245.1, DIG. 17; 435/266, 262.5

(56) References Cited

U.S. PATENT DOCUMENTS

| | | | |
|---|---|---|---|
| 5,064,763 A | * 11/1991 | Bentz | ......................... 435/262 |
| 5,637,498 A | 6/1997 | Ottengraf et al. | |
| 6,013,512 A | * 1/2000 | Turschmid et al. | ......... 210/615 |
| 6,291,233 B1 | * 9/2001 | Saha et al. | .................. 210/601 |

FOREIGN PATENT DOCUMENTS

| | | | |
|---|---|---|---|
| JP | 58-27619 | 2/1983 | |
| JP | 361038696 A | * 2/1986 | ............. C02F/3/34 |
| JP | 2000-426 | 1/2000 | |

OTHER PUBLICATIONS

IBM, 02–1973, IBM Technical Disclosure Bulletin NN73022831, vol. 15, issue 9, pp. 2831–2832.*

H. G. Gethke, VDI Berichte, No. 1034, pp. 541–564, "Positive und Negative Erfahrungen Mit Grosstechnischen Biofilteranlagen", 1993.

* cited by examiner

*Primary Examiner*—Stanley S. Silverman
*Assistant Examiner*—Edward Johnson
(74) *Attorney, Agent, or Firm*—Oblon, Spivak, McClelland, Maier & Neustadt, P.C.

(57) ABSTRACT

An exhaust gas containing nitrides is treated by a process comprising:

passing the exhaust gas containing nitrides through a microbe carrier packed layer while cyclically spraying circulating water onto the packed layer, thereby forming a water containing ammonia and conducting biological reactions in which ammonia is converted to nitrate;

converting the nitrate in the water to nitrogen by a denitrification reaction; and recirculating the water which has been denitrified in the process, wherein nitration of ammonia is conducted by spraying the circulating water having a pH regulated to not more than 7.5 onto the microbe carrier packed layer.

6 Claims, 3 Drawing Sheets

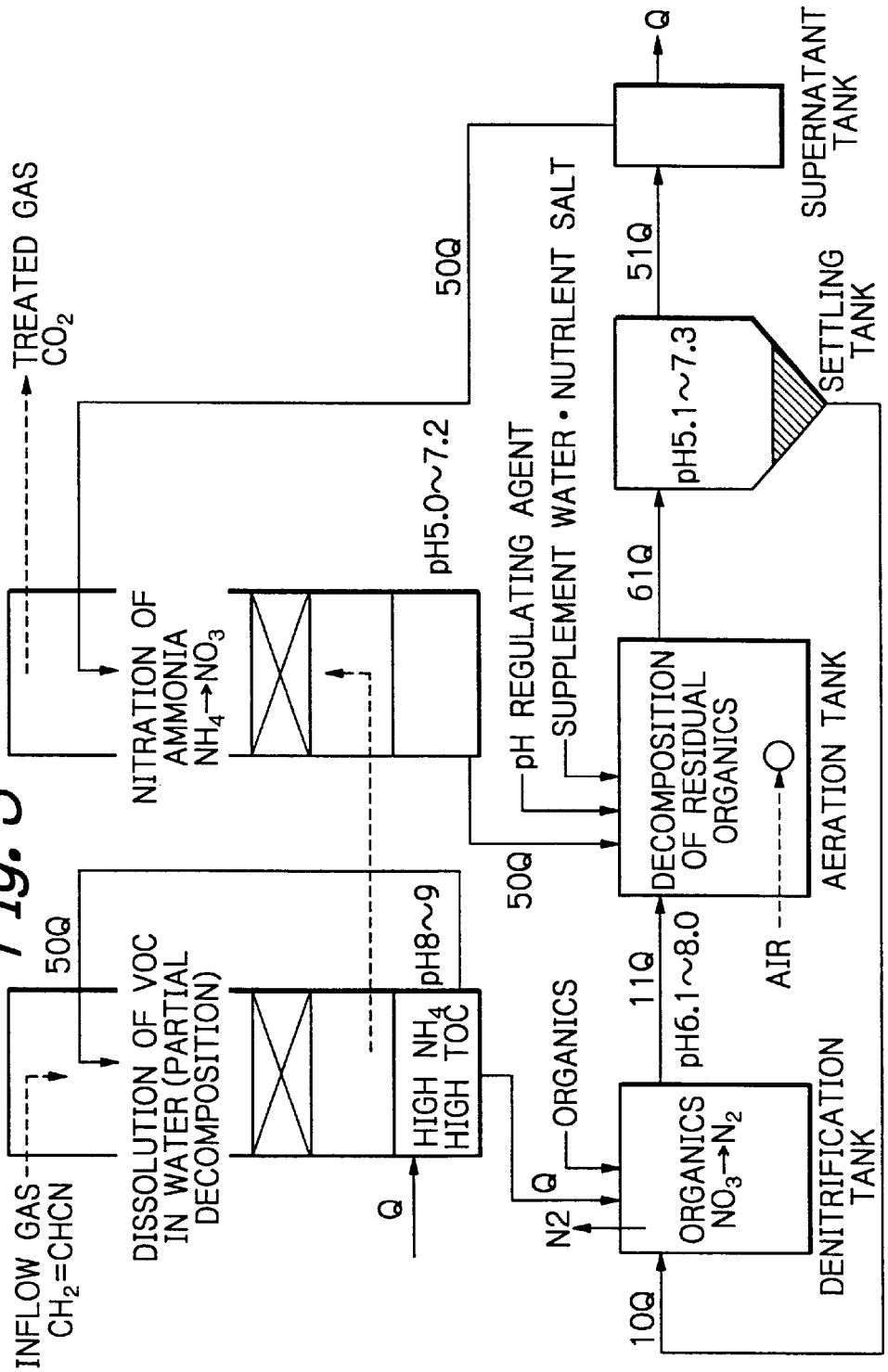

PROCESS FOR TREATING EXHAUST GASES CONTAINING NITRIDES

BACKGROUND OF THE INVENTION

The present invention relates to the treatment of exhaust gases and in particular, it relates to a process and apparatus for treating an exhaust gas containing volatile organic compounds (VOC's) or malodorous substances such as ammonia by passing it through a microbial carrier packed layer.

Heretofore, the biological treatment of exhaust gases containing VOC's generated in chemical plants and the like and those containing ammonia generated in facilities for treating raw sewage, plants for composting sludge and the like is a known method. In such a treatment process, the most serious trouble in the operational control of equipment which is highly possibly caused is clogging of the packed layer. This clogging is easy to occur at the part around the inflow opening of an exhaust gas where the concentration of the VOC's is highest. Further, when the exhaust gas containing nitrides having nitrogen in the molecule such as acrylonitrile, dimethylformaldehyde, ammonia are treated, ammonia accumulates in the equipment, particularly in the circulating water to be used for spraying in the course of treatment. Ammonia not only raises the pH and lowers the capacity of treatment but also causes a malodor by itself. Further, ammonia is oxidized mainly to nitric acid depending on the condition and also, this nitric acid lowers the pH to reduce the capacity of treatment. Therefore, this nitrogen component has to be removed out of the system. The nitrogen component can be removed by replacing the circulating water, but it will cause the use of a large amount of water and the treatment of waste water.

In view of the above described prior art, the present invention has an object to provide a process and an apparatus for biologically treating an exhaust gas containing nitrides which treat a circulating water containing ammonia within the treating system and do not require a large amount of water.

SUMMARY OF THE INVENTION

In order to fulfil the above described object, one embodiment of the present invention relates to a process for treating an exhaust gas containing nitrides by passing it through a microbial carrier packed layer while cyclically spraying water thereon, which comprises nitrating a circulating water containing ammonia, reducing the nitrated water to effect denitrification, and cyclically using the resulting water as a circulating water.

BRIEF DESCRIPTION OF THE DRAWINGS

FIG. 3 is an explanatory view of showing one example of the pH and the amount of the circulating water in carrying out the treating process according to the second embodiment of the present invention.

In these drawings, the numerals have the following meaning.

Figure 1:
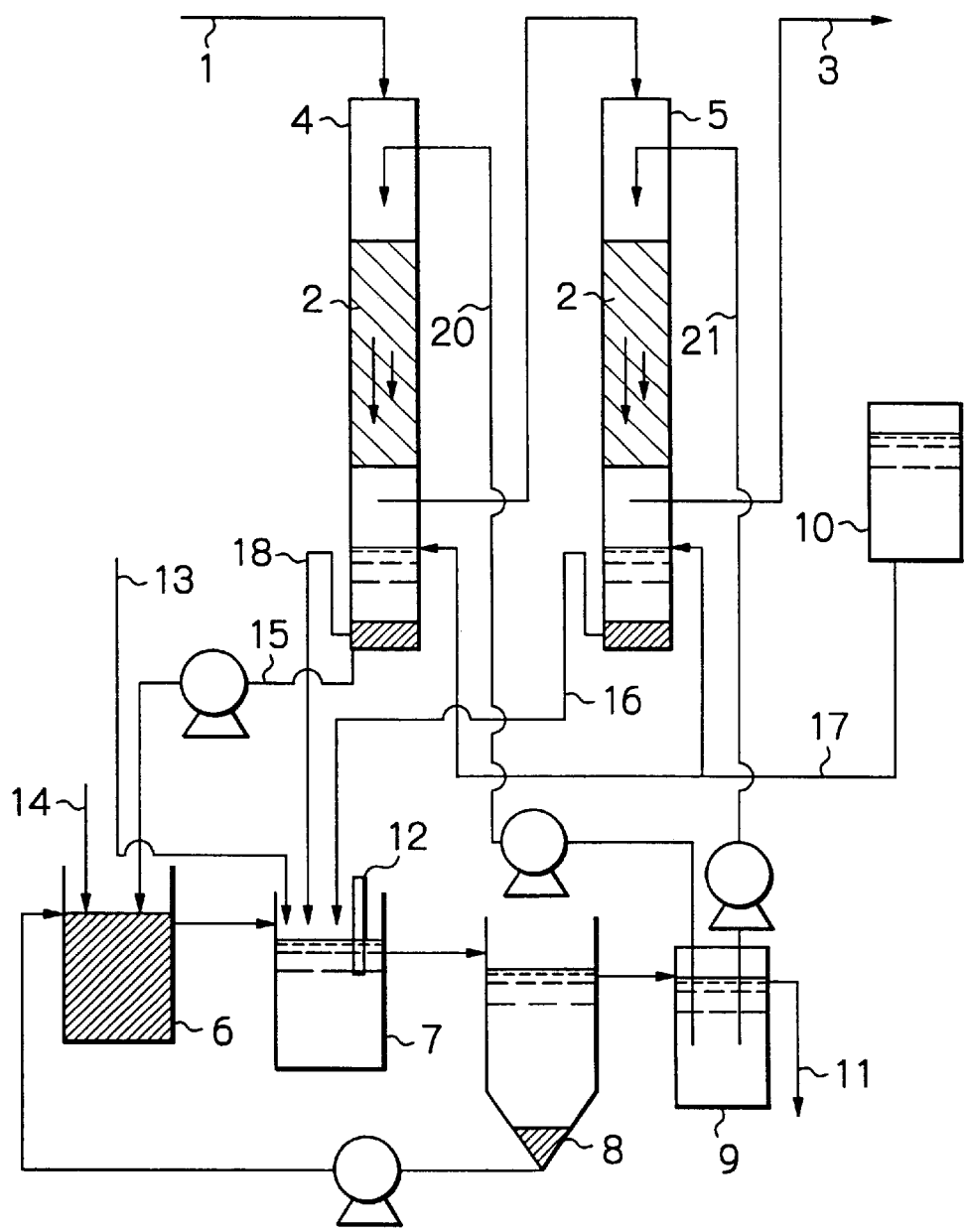
FIG. 1 is a flow constructional view showing one example of carrying out the process for treating an exhaust according to the first embodiment of the present invention.

In FIG. 1, 1:exhaust gas; 2:packed layer; 13:treated gas; 4:first exhaust gas treating tower; 5:second exhaust gas treating tower; 6:denitrification tank; 7:pH adjusting tank; 8:sludge settling tank; 9:circulating water tank; 10:supplemented water; 11:waste water; 12:pH sensor; 13:sodium hydroxide aqueous solution or hydrochloric acid aqueous solution; 14:methanol aqueous solution; 15:line; 16:line; 17:line; 18:line; 20:line; 21:line.

Figure 2:
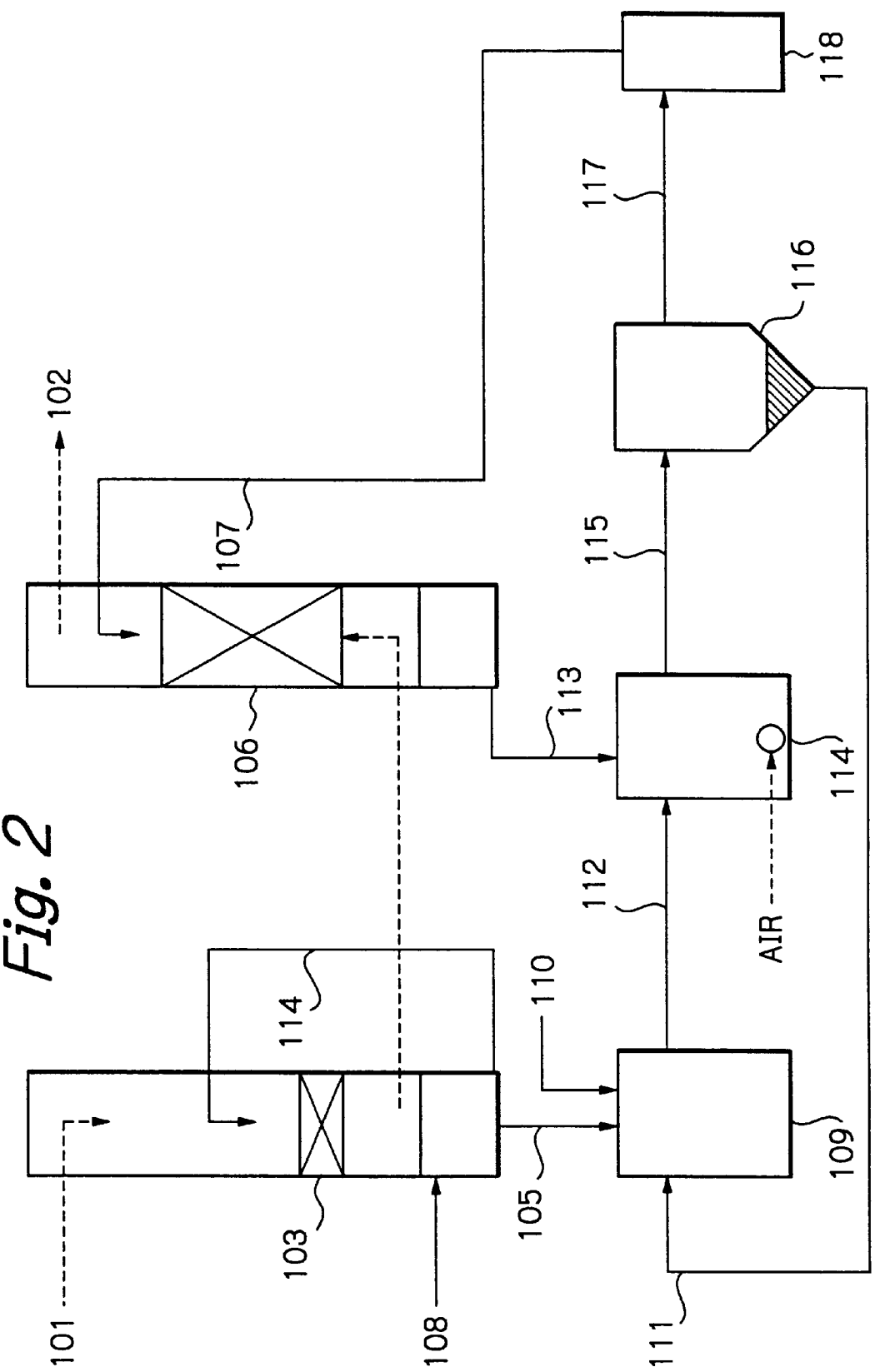
FIG. 2 is a flow constructional view showing one example of an apparatus for carrying out the treating process according to the second embodiment of the present invention.

In FIG. 2, 101:inflow gas; 102:treated gas; 103:packed layer of former stage; 104:circulating water of former stage; 105:effluent of circulating water of former stage; 106:packed layer of latter stage; 107:circulating water of latter stage; 108:water to be supplemented in former stage; 109:denitrification tank; 110:hydrogen donors; 111:returned sludge fluid; 112:denitrified water; 113:effluent of circulating water of latter stage; 114:aeration tank; 115:aerated water; 116:settling tank; 117:supernatant of settling tank; 118:tank for supernatant from settling tank.

In FIG. 3, Q means an unit of circulating water amount.

DETAILED DESCRIPTION OF THE INVENTION

In the process for treating an exhaust gas according to the first embodiment of the present invention, the nitration of the circulating water can be conducted by leading the ammonia-accumulated circulating water to a pH adjusting tank, for example, under the condition of a amount of the organic carbons loaded of 0.8 kg–C/m$^3$·day to adjust the pH of the circulating water and spraying the circulating water on to the above described microbial carrier packed layer. By this step, ammonia may be oxidized to nitric acid (nitration). Further, among the effluents generated by spraying the above described circulating water on to the microbial carrier packed layer, the effluent from the most upstream packed layer is led to the denitrification tank to effectively effect the denitrification. Since the effluent from the most upstream packed layer contains a largest amount of the organic compounds derived from the exhaust gas and thus, is efficient from the standpoint of supplying necessary organic compounds as hydrogen donors in denitrification step.

Further, the present invention also refers to an apparatus for treating an exhaust gas containing nitrides which comprises an exhaust gas treating tower having a microbial carrier packed layer through which an exhaust gas containing nitrides is passed and a mechanism for cyclically spraying water to pass, a circulating water tank to store the circulating water, a nitration mechanism to nitrate the circulating water, and a denitrification tank to reduce the nitrated water to effect denitrification, each tank being connected with a line.

In the above described apparatus for treating an exhaust gas, plurality of the microbial carrier packed layers with a mechanism of cyclically spraying water may be provided in series. The above described circulation line of the circulating water may be connected with the mechanism of cyclically spraying water of the packed layer at the most upstream, to thereby constitute the above described nitration mechanism to obtain a nitrated water.

The first embodiment of the present invention will be explained in more detail.

In the process for removing the VOC's having nitrogen or ammonia in an exhaust gas by using a biologically treating method according to the present invention, a packed column equipped with a packed layer filled with a packing retaining microorganisms is provided as the treating tower, and the packing material is allowed to retain microorganisms, and the exhaust gas is passed through the packed layer while spraying water on to the packing material to maintain it in the wet state. The water spraying is carried out by repeatedly drawing the circulating water from the circulating water tank and spraying it from the top of the packed layer onto it. The effluent of the spraying water is returned to the circulating water tank.

In the course of treating the exhaust gas, ammonia accumulates in the circulating water. The ammonia is oxidized to nitric acid (nitration), and the nitrated water is then reduced to conduct denitrification. At this time, the circulating water having ammonia dissolved therein shows a high pH and accordingly, the pH of the circulating water is adjusted to not higher than 7.5 with an acid such as hydrochloric acid. On the other hand, the nitric acid formed in the course of the nitration step lowers the pH of the circulation water and thus, in the denitrification step, the pH of the circulation water is adjusted to not lower than 6.5 with a base such as sodium hydroxide.

Nitration of ammonia may be conducted by using a separate bioreactor tank (a nitration tank). However, according to the present invention, the nitration can be carried out in the apparatus for biologically treating an exhaust gas by spraying circulating water on to the packed layer.

Thus formed nitric acid is then discharged out of the system by a denitrification reaction ($2NO_3 \rightarrow N_2 + 3O_2$). The denitrification reaction may be anaerobically carried out in the presence of a denitrification bacteria in a denitrification tank which prevents infiltration of oxygen. Thus denitrified water loses nitric acid by denitrification. Therefore, the pH of the water is raised. Thus, the circulating water after denitrification may be mixed with the circulating water after nitration step which has lowered pH by nitration or with an acid such as hydrochloric acid to thereby adjust the pH of the water to not higher than 7.5.

The denitrification reaction requires about 1–3 kg of hydrogen donor per 1 kg of nitrate nitrogen. The ratio of the hydrogen donor to the nitrate nitrogen can be confirmed by measuring the concentration of the nitrate nitrogen and that of the TOC in the water flowing in the denitrification tank.

In the case that the organic nitrides are treated or in the case that both the organic nitrides and the inorganic nitrides are all together treated, in order to effectively utilize the organic compounds as hydrogen donors for denitrification, the packed layer may be divided into two or more, and the effluent of the spraying water which has passed through the packed layer at the nearest side of the exhaust gas inlet (that is, the packed layer at the most upstream) may be allowed to flow into the denitrification tank so as to allow the organic compounds to be introduced into the denitrification tank as much as possible. Further, the amount of the spraying water at the side of the exhaust gas inlet (upstream side) may be decreased compared to that at the downstream side, whereby the concentration of the organic compounds flowing into the denitrification tank can be increased to improve the utilization of the organic compounds as hydrogen donors in denitrification.

When hydrogen donors are still insufficient or the exhaust gas to be treated does not contain hydrogen donors, the denitrification reaction may be carried out by adding a hydrogen donor such as methanol into the denitrification tank.

According to the first embodiment of the present invention as explained above, accumulation of ammonia in circulating water to be used in the process of treating an exhaust gas by passing it through a microbial carrier packed layer is inhibited. According to this process, when the concentration of microorganisms in the packed layer is maintained at a comparatively low level, organic compounds are not decomposed in the packed layer. Therefore, the organic compounds derived from the exhaust gas are supplied to an denitrification tank, whereby the organic compounds may be efficiently utilized in the denitrification reaction.

However, when the concentration of microorganisms in the packed layer once rises, the organic compounds are decomposed by oxidation in the packed layer, whereby the amount of the organic compounds supplied to the denitrification tank is reduced. Then, not only the capacity of denitrification is lowered but also excess microorganisms are propagated in the packed layer, which causes increase of a pressure loss, and finally the packed layer is clogged. Although the capacity of denitrification can be recovered by supplying an additional hydrogen donor (for example, methanol) to the denitrification tank, clogging of the packed layer cannot be inhibited, as well as a possibility of further causing clogging is increased.

Further, the concentration of nitrides in an exhaust gas is generally not constant and varies. Especially when the concentration of the nitrides in the gas rapidly rises, the concentration of ammonia in the circulating water rises, and in its turn causes formation of free ammonia. Amounts of the free ammonia exceeding a certain level damage nitrating bacteria in the packing layer to reduce the capacity of nitration of the apparatus. As the result, the concentration of ammonia in the apparatus further increases to cause lowering of the treating performance, leakage of ammonia and the like. The nitrating bacteria have a narrow optimum range of pH and are highly sensitive to free ammonia and, in addition, are low in the propagation rate and thus, once damaged, it takes a long period of time for recovery.

Further, nitric acid is formed by the oxidation of ammonia (nitration) to lower the pH of the circulating water, whereas the pH of the circulating water will rise upon denitrification. Accordingly, if the entire ammonia flowing into the system is denitrified, the pH of the circulating water is retained constant. In other words, when the denitrification is insufficient, nitric acid remains and as the result, the pH of the circulating water is lowered. The denitrification requires a definite amount of hydrogen donors relative to the amount of nitrogen, but depending upon the composition of the exhaust gas introduced, a sufficient amount of hydrogen donors is not necessarily be supplied. Further, part of the organic compounds undergoes oxidative decomposition even in the packed layer, and the decomposed organic compounds are not supplied to the denitrification tank and accordingly, not utilized as hydrogen donors in the denitrification. Thus, it is necessary to supplement organic compounds. However, the amount of the organic compounds to be supplemented must be appropriate. If excess amount of hydrogen donors are supplemented, not only the cost is increased, but also the residual hydrogen donors are supplied to the packed layer which breed the microorganisms in the packed layer to thereby increase the pressure loss in the packed layer causing clogging.

Accordingly, the second embodiment of the present invention is to provide a process for biologically treating an exhaust gas which can inhibit the decomposition of organic compounds in the packed layer to prevent clogging of the packed layer and, at the same time, efficiently use the organic compounds as hydrogen donor in the denitrification and, in addition, hardly damage nitrating bacteria when the concentration of the nitrides in the exhaust gas is rapidly increased and furthermore, supply the hydrogen donors to be supplementarily added for the denitrification neither too much nor too less in treating nitrides.

In order to fulfil the above described object, the second embodiment of the present invention relates to a process for treating an exhaust gas by passing an exhaust gas containing nitrides through the microbial carrier packed layers while spraying the circulating water thereon, which comprises nitrating a circulating water containing ammonia, reducing the nitrated water to effect denitrification, and cyclically using the resulting water as a circulating water, wherein the microbial carrier packed layer is divided into a former stage and a latter stage, the circulating water of the former stage is regulated at a weak alkalinity of pH 8 to 9 and that of the latter stage at a weak acidity to a neutrality of pH 5.0 to 7.2 to effect water spraying, the water circulating water withdrawn from the former stage is mixed with that from the latter stage to render the pH of the circulating water at a neutrality of pH 6.0 to 8.0, and the resulting neutralized circulating water is subjected to denitrification.

In the above described process for treating an exhaust gas, the microbial carrier packed layer can be a gas scrubbing column of the dropping type or bubbling type. The mixing of the circulating water withdrawn can be carried out by combining the circulating water withdrawn from the latter stage with the denitrified water, subjecting the combined circulating water to aeration treatment, and mixing the sludge separated by the precipitation treatment of the resulting treated water with the circulating water withdrawn from the former stage.

The denitrification treatment can be carried out while measuring the pH value of the water to be treated and adjusting the amount of hydrogen donors to be added depending on the measured value. More specifically, when the solution to be treated is acidified (pH of 5.5 to 6.6), organic compounds as hydrogen donor is supplied, and when the solution to be treated is neutralized or alkalized (pH of 7.0 to 8.0), the supply of the organic compounds is stopped.

In the second embodiment of the present invention, an exhaust gas containing nitrides is passed through two-stages packed layers in which the circulating water of the former stage is rendered at a weak alkalinity of pH 8 to 9 and that of the latter stage is rendered at a weak acidity to neutrality of pH 5.0 to 7.2. The circulating water withdrawn from the former stage is mixed with that from the latter stage to render the pH of the mixed circulating water at a neutrality of pH 6.0 to 8.0, and then supplied to a denitrification tank. In order to maintain the circulation water in the former stage at a pH of a weak alkalinity, the amount of water to be supplemented to the former stage is regulated depending upon the load of nitrogen and the concentration of carbon dioxide of the inflow gas and the alkalinity of the circulating water.

The dissolution of various nitrides in water is mostly quicker than the nitration reaction, and thus the volume of the packed layer for the former stage can be miniaturized. Accordingly, the packed layer of the former stage can be a gas scrubbing column of the dropping type such as a spray column, a venturi scrubber and a cyclone scrubber or a gas scrubber of the bubbling type such as a bubbling tower.

When the pH of the circulating water is acidified (pH 5.5 to 6.8), methanol is introduced as the hydrogen donor, and when the pH of the circulating water is neutralized or alkalized (pH 7.0 to 8.0), the introduction of methanol is stopped. The concentration of the residual nitric acid can be controlled by changing the set pH. When the pH is set at a high pH value, a large amount of methanol is introduced to lower the concentration of nitric acid. In some cases, it is possible to decomposing all residual nitric acid. On the contrary, when the pH is set at a low pH value, the amount of methanol to be introduced is decreased to raise the concentration of the residual nitric acid.

Next, the second embodiment of the present invention will be explained in more detail.

In the second embodiment of the present invention, there is provided two packed columns of a former stage and a latter stage each having a packed layer filled with a packing material retaining microorganisms. The packed layer is allowed to retain microorganisms and the exhaust gas is passed through these two columns in series while spraying water on to the packing material to maintain them in the wet state. In this instance, the former stage is rendered in an alkaline condition of pH 8 to 9.

The water spraying in the former stage is carried out by repeatedly drawing the circulating water in the receiving vessel for the spraying water and spraying the water from above the packed layer onto it. Volatile nitrides are dissolved in the circulating water, and are decomposed to form ammonia in the circulating water. Accordingly, the concentration of ammonia in the circulating water is increased. To the receiving vessel for the spraying water, a definite amount of water is supplied. By controlling the amount of the water to be supplied, the concentration of ammonia in the circulating water is adjusted so as to allow the pH of the circulating water to fall in the range of 8 to 9. The preferred amount of the circulating water varies depending on the amount of the nitrogen loaded and that of the carbon dioxide loaded by the inflow gas, the alkalinity of the circulating water and thus, an optimum amount of water to be supplemented is determined each time. The effluent of the circulating water from the former stage is introduced into a denitrification tank.

The water spraying in the latter stage is carried out by drawing the circulating water from a tank for the supernatant from a settling tank (explained below), and spraying the water from above the packed layer onto it. The sprayed water is received by a receiving vessel for the sprayed water and then introduced into an aeration tank. The exhaust gas after the former stage treatment contains ammonia, which is then oxidized to nitric acid in the packed layer of the latter stage. Thus, the pH of the circulating water of the latter stage is lowered. In the aeration tank, the circulating water from the latter stage is mixed with the denitrified water from the denitrification tank. In the denitrified water, ammonia is present and nitrate ions are decomposed by the denitrification reaction. Therefore, ammonia contained in the denitrified water neutralizes the circulating water of the latter stage. However, when the denitrification is not sufficiently carried out, nitrate ions remain in the denitrified water which render the neutralization insufficient, and the pH is lowered. The aerated water is then subjected to solid-liquid separation in the subsequent settling tank.

Into the denitrification tank, the entire amount of the effluent of the circulating water from the former stage is introduced, and a sludge mixed fluid separated in the settling tank is also introduced. When the exhaust gas to be treated contains organic compounds, they are dissolved in the effluent of the circulating water from the former stage. The sludge mixed fluid from the settling tank contains nitrate ions. Accordingly, the nitrate ions are reduced in the denitrification tank to release a nitrogen gas.

When organic compounds are not present in the exhaust gas to be treated, or when they do not reach a sufficient amount as hydrogen donor for denitrification, a hydrogen donor may be supplementarily added to the denitrification tank. As the hydrogen donor, methanol, ethanol and the like can be utilized. The denitrified water is sent to the aeration tank where it is mixed with the effluent of the circulating water of the latter stage.

The pH in the denitrification tank is determined mainly by the alkalinity of the circulating water and the concentration of the residual nitrate ions to be lost in the denitrification. Accordingly, when the amount of the hydrogen donors to be supplied to the denitrification tank is sufficient, nitric acid completely disappears to render the pH of the denitrification tank neutral. On the other hand, when the amount of the hydrogen donors to be supplied is insufficient, nitrate ions remain to lower the pH. Thus, when the pH is lowered, some organic compounds may be added, and when it reaches a definite amount (which is determined depending on each loading condition and the target of treatment), addition of the organic compounds may be stopped, whereby the organic compounds to be supplemented can be supplied neither too much nor too less.

The present invention will now be more concretely explained by an example.

EXAMPLE 1

This example explains the first embodiment of the present invention. In the experiment, the apparatus shown in FIG. 1 was used. A simulated exhaust gas containing acrylonitrile which is a volatile organic nitride was continuously treated for a long period of time. In this instance, the ammonia which was formed in the course of biological treatment and dissolved in the circulating water is removed by biological nitration/denitrification, whereby a process capable of preventing accumulation of ammonia in the circulating water and carrying out the treatment of exhaust gas with a reduced amount of water could be established.

The apparatus of FIG. 1 was composed of exhaust gas treating towers 4 and 5 each having an organism carrier packed layer 2, a pH adjusting tank 7, a sludge settling tank 8, a circulating water tank 9, and a denitrification tank 6.

In the organism carrier packed layer 2, a carrier made of a foamed polypropylene was filled to a height of 1 m. Two treating towers thus filled were connected with each other in series, and designated as a first tower 4 and a second tower 5 from the gas inlet side (upstream side). In the packed layer 2, an activated sludge liquid from a plant waste water treating facility was added as the VOC decomposing organism inoculation source. Water spraying was continuously carried out. As the acrylonitrile-containing simulated exhaust gas, commercially available acrylonitrile was aerated with a nitrogen gas to generate an acrylonitrile-containing gas, which was then supplied by a compressor and mixed with air added with an almost saturated steam to adjust the concentration of the gas to about 200 ppm.

Gas 1 thus prepared was supplied at a space column velocity of 50 $h^{-1}$ (6 L/min) from above the packed layer 2 of the first tower 4.

The inflow gas 1 and the treated gas 3 were collected, and the concentration of acrylonitrile was analyzed by gas chromatography to clarify the removal ratio.

The water spraying in the first tower 4 was carried out by drawing a circulating water at a flow rate of 60 ml/min from a circulating water tank 9 through line 20. The entire amount of the effluent of the spraying water in the first tower 4 was supplied to a denitrification tank 6 (volume: 15 L) through line 15. In the denitrification tank 6, an activated sludge liquid from a plant waste water treating facility was added as the denitrification bacteria inoculation source. A pH adjusting tank 7 was provided downstream of the denitrification tank 6 and further a sludge settling tank 8 was provided downstream of the pH adjusting tank 7. A sludge collected in the sludge settling tank 8 was returned to the denitrification tank 6 at a flow rate of 5 ml/min. The circulating water tank 9 was provided downstream of the sludge settling tank 8. The water spraying in the second tower 5 was carried out by drawing the circulating water from the circulating water tank 9 at a flow rate of 150 ml/min through line 21. The effluent from the second tower 5 is introduced into the pH adjusting tank 7 through line 16.

In the pH adjusting tank 7, in. order to maintain the pH of the circulating water at 6.5 to 7.5, the pH of the water was monitored by a pH sensor 12, and depending on the monitored result, a sodium hydroxide aqueous solution or a hydrochloric acid aqueous solution was added through line 13. Furthermore, supplementary water 10 was supplied to the bottom of the first and second towers 4 and 5 through line 17. The supplementary water 10 was preparing by adding 15 mg/L of dipotassium hydrogen phosphate, 5.4 mg/L of ferrous sulfate and 2 mg/L of yeast extract to tap water.

Water 11 overflowed from the circulating water tank 9 was collected as the waste water, and the concentrations of nitrate nitrogen and ammonia nitrogen are measured.

The conditions under which the experiments were carried out are shown in Table 1.

TABLE 1

| | Denitrification | pH Adjustment | Amount of Supplemented Water (L/d) |
|---|---|---|---|
| Condition 1 | yes | yes | 0.7 |
| Condition 2 | yes | yes | 3.7 |
| Condition 3 | no | no | 0.7 |
| Condition 4 | no | no | 3.7 |

That is, in Conditions 3 and 4, pH adjustment is not carried out in tank 7.

The results of the experiments which clarified the removal performance of acrylonitrile in the exhaust gas 3, and the concentrations of ammonia nitrogen and nitrate nitrogen in the waste water 11 under the four conditions of Table 1 are shown in Table 2.

TABLE 2

| | Removal Ratio of Acrylonitrile (%) | Concentration of Nitrate Nitrogen (mg/L) | Concentration of Ammonia Nitrogen (mg/L) |
|---|---|---|---|
| Condition 1 | >99 | 123 | 7 |
| Condition 2 | >99 | 22 | 8 |
| Condition 3 | 81 | 0 | 1228 |
| Condition 4 | >99 | 0 | 292 |

It appears from the results shown in the above table, that, without carrying out denitrification, the ammonia nitrogen was accumulated in the waste water as in Condition 3 and Condition 4. Furthermore, with a reduced amount of the supplemented water, the removal performance was lowered. On the other hand, when the nitration and denitrification were carried out while conducting the pH adjustment and the supply of water to the denitrification tank, the ammonia nitrogen was decreased and a high removal ratio of acrylonitrile was obtained. Further, the concentration of the nitrate nitrogen rose, and reached 123 mg/L under the condition of a reduced amount of the supplemented water.

Then, a methanol solution having a concentration of 10 g/L was added to the denitrification tank at a flow rate of 20 ml/d through line 14. As the result, the concentration of the nitrate nitrogen was decreased to 9 mg/L. Thus, when the hydrogen donors for the denitrification reaction were insufficient, the denitrification reaction could be effectively carried out by adding an additional hydrogen donors.

EXAMPLE 2

This example explains the second embodiment of the present invention. FIG. 2 shows a flow constructional view of an apparatus employed in this example. In FIG. 2, numeral 103 is a packed layer of the former stage, numeral 106 a packed layer of the latter stage, numeral 109 a denitrification tank, numeral 114 an aeration tank, numeral 116 a settling tank, and numeral 118 a tank (an effluent tank) for the supernatant in the settling tank.

By using the apparatus as shown in FIG. 2, a simulated exhaust gas 101 containing acrylonitrile of a organic nitride (acrylonitrile concentration: 200 ppm) was continuously treated. In this instance, as the microbial carrier packed layer, two layers of a packed layer 3 of the former stage and a packed layer 6 of the latter stage were used. As the microbial carrier, a packing material of a polypropylene (trade name "POLERING", a product of Dotwell) was filled in the former stage packed layer 103, and a packing material of a foamed polypropylene (trade name "BIOSTAGE", a product of Tsutsunaka Sheet Proofing Co., Ltd.) was filled in the latter stage packed layer 106. In the packed layers 103 and 106, an activated sludge liquid-from a plant waste water treating facility was added as the VOC decomposing organism inoculation source. The space column velocity of the exhaust gas to be treated relative to the volume of the packed layer was set at 500 $h^{-1}$ in the first stage and at 100 $h^{-1}$ in the second stage. In other words, the volume ratio of the packed layer of the former stage to that of the latter stage was set at 1:5.

By setting the amount of the water 108 to be supplemented to the circulating water 104 of the former stage at a low level (0.28L-water/$m^3$-gas), the concentration of ammonia was increased to maintain the pH of the circulating water 104 of the former stage at about 8.4. The effluent of the circulating water 105 of the former stage was introduced into the denitrification tank 109. In the denitrification tank 109, an activated sludge liquid from a plant waste water treating facility was added as the denitrification bacteria inoculation source. The circulating water 107 of the latter stage was supplied from supernatant tank 118 and passed as such through the packed layer 106 of the latter stage and circulated via the aeration tank 114, the settling tank 116, and the supernatant tank 118. In the supernatant 117 of the settling tank 116, ammonia was almost completely. oxidized to nitric acid to lower the pH of the circulating water up to about 5.5.

The denitrification was carried out in the denitrification tank 109, and the denitrified water 112 was sent to the aeration tank 114. The effluent of the circulating water of the latter stage was also allowed to flow into the aeration tank 114 and mixed by aeration, and then sent to the settling tank 116 where sludge was separated, and the returned sludge fluid 111 thus separated is allowed to flow into the denitrification tank 109. In the denitrification tank 9, the nitrate ions in the returned sludge fluid 111 was denitrified by utilizing the hydrogen donors in the effluent of the circulating water of the former stage and released out of the system.

The operational conditions as mentioned above are designated as Condition 1 in Table 3 as will be described below.

In this case, the removal ratio of acrylonitrile was more than 99%, and 45% of the nitrogen present in the removed acrylonitrile were denitrified. As the result, the pH in the denitrification tank 109 was affected by the neutralization with the effluent 105 (pH: 8.4; concentration of ammonia: 220 mg-N/L) of the circulating water of the former stage and the effluent 113 (pH: 5.5) of the circulating water of the latter stage and the denitrifying action, and accordingly showed pH 6.5 and the concentration of nitrate ions in the effluent showed 120 mg-N/L.

Then, as shown in Condition 2 of Table 3, when the pH of the denitrification tank 109 was lowered to less than 7.0, methanol was introduced as the hydrogen donors 110. As the result, the pH of the effluent of the circulating water of the latter stage rose to about 6.5 to maintain the pH of the denitrification tank 109 at about 7, and the concentration of nitrate ions came to 8 mg/L on the average. Successively, acrylonitrile could stably be treated under the same conditions for at least one month, 95% of the amount of the nitrogen loaded could be released by the denitrification reaction. At this time, upon measuring the TOC concentration of the denitrified water 112, it was found that the TOC concentration was slightly increased compared to the case where methanol was not added but the added methanol was mostly consumed in the denitrification tank 109.

Further, for comparison, the treatment of an exhaust gas was conducted in the condition that the flow amount of the water 108 to be supplemented was increased in the former stage (4.2 L-supplemented water/$m^3$-gas) as shown in Condition 3 in Table 3. The pH of the circulating water of the former stage 104 showed 7.5. Successively, upon adding methanol 110 as shown in Condition 4, at the time of initiating the operation, a high removal performance (removal ratio: not less than 99%) could be obtained and, at same time, the concentration of nitrate ions in the effluent was decreased to 6 mg/L. However, when the operation was continued under the same conditions, the packed layer 103 of the former stage clogged in five days and the subsequent operation could not be continued. In other words, excess bacteria bred in the packed layer 103 of the former stage to cause clogging of the packed layer.

These testing conditions are set forth in Table 4. In Table 4, "culture medium" means supplemented water to which a nutrient broth having a composition shown in Table 3 has been added, and "treated water" means effluent of 113 of the circulating water of the later stage.

TABLE 3

| Composition of Nutrient Broth | |
|---|---|
| $KH_2PO_4$ | 0.1 g |
| $K_2HPO_4$ | 0.3 g |
| $MgSO_4.7H_2O$ | 5 mg |
| $CaCl_2.2H_2O$ | 1 mg |
| $FeSO_4.7H_2O$ | 1 mg |
| $ZnSO_4.7H_2O$ | 0.1 mg |
| $MnCl_2.4H_2O$ | 0.1 mg |
| yeast extract | 2 mg |
| tap water | 1 liter |

TABLE 4

| | Supplemented Water Source in Former Stage | Flow Amount of Supplemented Water in Former Stage (L-supplemented water/m³-gas) | Methanol |
|---|---|---|---|
| Condition 1 | Culture Medium | 0.28 | Not added |
| Condition 2 | Culture Medium | 0.28 | Added |
| Condition 3 | Treated Water | 4.2 | Not Added |
| Condition 4 | Treated Water | 4.2 | Added |

The test results are set forth in Table 5.

TABLE 5

| | Removal Ratio of Acrylonitrile | Concentration of Nitrate Nitrogen (mg/L) | pH of Circulating Water of Former Stage | Clogging |
|---|---|---|---|---|
| Condition 1 | >99 | 120 | 8.4 | no |
| Condition 2 | >99 | 8 | 8.4 | no |
| Condition 3 | >99 | 101 | 7.5 | unknown |
| Condition 4 | >99 | 6 | 7.5 | yes |

FIG. 3 is an explanatory view of showing one example of the pH and the amount of the circulating water in carrying out the treating process of the present invention. In FIG. 3, Q means an unit of circulating water amount.

From the above described results the following will be understood.

By operating the packed layer 103 of the former stage at an alkalinity, clogging of the packed layer of the former stage could be prevented.

By maintaining the circulating water of the former stage at an alkalinity and the circulating water of the latter stage at an acidity and combining them, the circulating water of the former stage and that of the latter stage could be neutralized with each other.

At a volume ratio of the packed layer of the former stage to that of the latter stage to 1:5, acrylonitrile could be sufficiently removed.

Upon feeding methanol to the denitrification tank and controlling the amount thereof to be introduced based on the pH measurement, the methanol could be introduced neither too much nor not too less.

Upon treating an exhaust gas containing a nitride according to the present invention, accumulation of ammonia in a circulating water can be prevented. Thus, the amount of water to be used can be decreased to a great extent and the lowering in the capacity of treatment due to the presence of ammonia and the secondary generation of a malodor due to the generation of an ammonia gas in the treated gas and the like can also be prevented.

In the apparatus for biologically treating an exhaust gas according to the present invention, the packed layer can be utilized as the nitrating tank and thus, the nitrating tank which is necessary in the treatment of waste water becomes unnecessary.

Furthermore, according to the second embodiment of the present invention, clogging of the packed layers can be prevented. In the case of an exhaust gas containing a nitride, not only the prevention of clogging of the packed layers but also the prevention of accumulation of ammonia in the circulating water can be done, and hydrogen donors to be supplementarily added can be supplied neither too much nor too less.

What is claimed is:

1. A process for treating an exhaust gas containing nitrides, comprising:

passing the exhaust gas containing nitrides through a microbe carrier packed layer while cyclically spraying circulating water onto the packed layer, thereby forming a water containing ammonia and conducting biological reactions in which ammonia is converted to nitrate;

converting the nitrate in the water to nitrogen by a denitrification reaction; and recirculating the water which has been denitrified in the process, wherein nitration of ammonia is conducted by spraying the circulating water having a pH regulated to not more than 7.5 onto the microbe carrier packed layer.

2. The process for treating an exhaust gas containing nitrides of claim 1, wherein the nitration and the denitrification of the nitrate in the circulating water is conducted while the pH of the circulating water is regulated to 6.5 to 7.5.

3. A process for treating an exhaust gas containing nitrides, comprising:

passing the exhaust gas containing nitrides through a microbe carrier packed layer separated into a former stage and into a latter stage and while spraying a circulating water having a pH of 8 to 9 through the former stage and a circulating water having a pH of 6.0 to 8.0 through the latter stage;

mixing the water obtained from the former stage with the water withdrawn from the latter stage to form a circulating water having a pH of 6.0 to 8.0; and subjecting the mixed water material to denitrification.

4. The process for treating an exhaust gas containing nitrides of claim 3, wherein the microbe carrier packed layer is within a gas scrubbing column of the dropping type or the bubbling type.

5. The process for treating an exhaust gas containing nitrides of claim 3, wherein the mixing of the circulating water withdrawn from the former and latter stages is conducted by mixing the circulating water withdrawn from the latter stage with a treated water obtained from the denitrification step;

allowing the mixed water to stand thereby permitting sludge within the water to settle from the water; and mixing the sludge separated by the settling treatment with the water withdrawn from the former stage.

6. The process for treating an exhaust gas containing nitrides of claim 3, wherein the denitrification treatment is conducted while measuring the pH of a treated solution obtained from the denitrification treatment, such that in the event the water withdrawn from the denitrification treatment must be acidified to result in an appropriate pH for the circulating water passed into the former stage or the latter stage, organic compounds are added to the withdrawn water or in the event the water withdrawn from the denitrification treatment must be treated with base, or is neutral, to result in an appropriate pH for the circulating water passed into the latter stage, no organic compounds are added to the withdrawn water.

* * * * *